Nov. 15, 1932.                 S. W. BORDEN                 1,887,915
                              EARTH OHMMETER
                             Filed Dec. 3, 1930

*Fig. 2.*              *Fig. 3.*

*Fig. 4.*     *Fig. 5.*

Stephen W. Borden,
Inventor

Patented Nov. 15, 1932

1,887,915

UNITED STATES PATENT OFFICE

STEPHEN W. BORDEN, OF SUMMIT, NEW JERSEY

EARTH OHMMETER

Application filed December 3, 1930. Serial No. 499,695.

This invention pertains to electrical meters for measuring the resistance of earth electrodes and is of the nature of a modified Wheatstone bridge. Meters of this class are described in my co-pending applications Serial Nos. 347,780, 382,753 and 462,878.

Among the objects of the invention is the construction of a meter requiring a relatively small amount of space and which will be relatively inexpensive to build and which can be constructed, in large part, by commercially obtainable articles which are being produced in large volume for other purposes.

Figure 1:
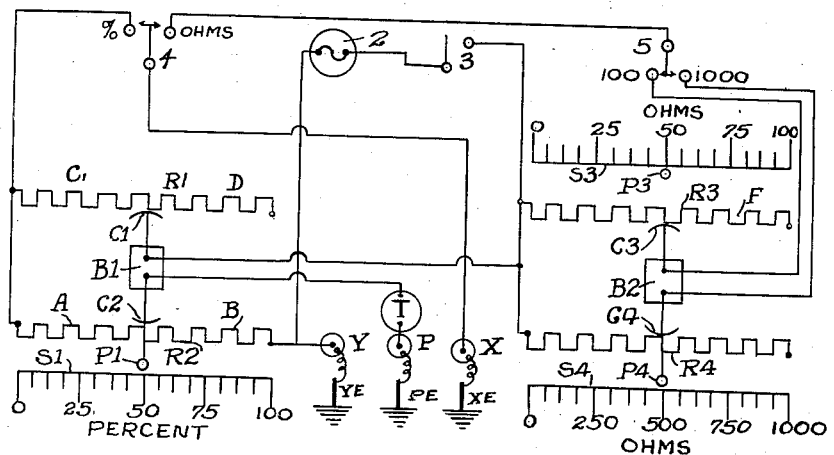
Figure 1:
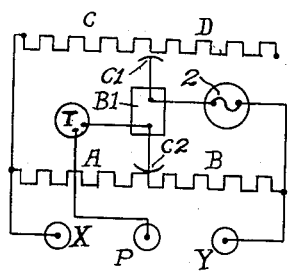
Figure 1:
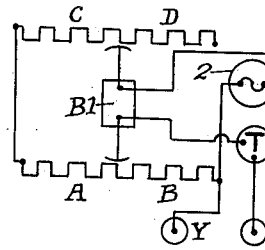
Figure 1:
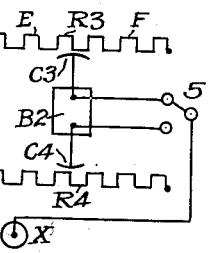
Figure 1:
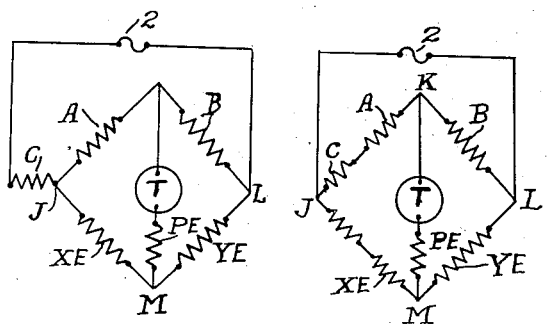

Referring to the drawings which are all schematic, Fig. 1 shows all the operating elements composing the meter and the circuit arrangements. Fig. 2 shows the circuit arrangement of the elements in use when the main switch is thrown to the left or to the percentage position and Fig. 3 shows the circuit arrangement of the elements in use when the switch is thrown to the right or the X position. Fig. 4 is a simplified diagram corresponding to Fig. 2 and Fig. 5 is a simplified diagram corresponding to Fig. 3.

Referring to Fig. 1: 2 is a source of current for the bridge and 3, 4 and 5 are switches. R1, R2, R3 and R4 are variable resistances which are varied by moving the common operating members B1 and B2 carrying the movable contacts C1, C2, C3 and C4, contacts C1 and C2 being insulated from each other and C3 and C4 being insulated from each other. P1, P3 and P4 are pointers attached to the operating members and moving over scales S1, S3 and S4. T is a telephone receiver or other suitable current detector. Y, P and X are binding posts for connection to earth electrodes YE, PE and XE.

The switches may be of the miniature tumbler or toggle types commonly used in radio work for panel mounting. The variable resistances R1 and R2 may conveniently be circular rheostats mounted in tandem and having their contacts C1 and C2 actuated by a common shaft and resistances R3 and R4 may consist of similar equipment. Such dual rheostats are commonly used in radio work and are readily available. The pointer is also attached to the common shaft and moves over a suitable scale.

It is to be understood that any arrangement of the variable resistances R1 and R2 may be used so long as the arrangement is such that any manipulation will always result in an equal change in value in each rheostat. When the resistance R3 is used singly, it may be any kind of variable resistance, it only being necessary that suitable provisions be made for readily observing the amount of resistance in circuit. Thus it would be feasible to substitute an ordinary decade resistance box for rheostat R3.

The scale S1 is not essential to the operation of the meter but the information obtained from it is useful to the tester as it indicates the relative value of the reference electrode YE with respect to the permanent electrode XE and it is desirable that the percentage indicated be not too low, for the best results.

In the preferred form of my meter the resistances R1 and R2 are of equal total resistance and the contacts C1 and C2 move simultaneously over the resistances from one end to the other. The resistance of R1 need have no particular value but should be selected from a consideration of the purposes for which the meter is to be used and generally should be of about the value of the average values of the earth electrodes whose resistance is to be measured with the meter. In the particular meter described, R1 and R2 have been made of 100 ohms total resistance each.

The resistance R3 may be of whatever value is desired, the scale S3 being calibrated to correspond with the resistance. In this particular meter I have used a resistance of 100 ohms. The resistance R4 is not essential to the working of the meter but is provided in order to increase the range of resistances which may be conveniently measured with the meter. In this particular meter I have made R4 of 1000 ohms and have shown a scale S4 corresponding to the resistance. However it is not necessary to have scale S4 as the single scale S3 would suffice, the readings being multiplied by 10 when the resistance R4 is used. If desired, additional rheostats may be provided, all operating in unison, and this multiplicity of rheostats will result in a multiplicity of ranges for the meter.

For the purpose of this present invention, any suitable source of power can be used with the bridge, it being only necessary that the detector T be suitable for the type of power used. The detector T may be a telephone, a galvanometer or any other suitable device for detecting zero current.

Whenever the resistance of the electrodes XE, PE or YE is referred to, it is to be understood to mean the resistance offered to the flow of current from the electrode into the surrounding earth generally and will be referred to as resistance XE, PE and YE respectively.

The operation of the meter is as follows: To measure the resistance of an earth electrode as XE, the electrode is connected to the binding post X. A current return reference electrode, as YE, is driven into the ground at a suitable distance from XE and connected to binding post Y. Another electrode, as PE, is driven into the ground at a suitable distance from the other two electrodes and connected to binding post P. The switch 4 is now thrown to the left or percentage position resulting in the formation of a Wheatstone bridge as shown in Fig. 4. Switch 3 is closed. The bridge is now balanced by moving B1 until the detector T indicates zero current. The theory of a Wheatstone bridge is such that the bridge will be balanced, that is, there will be no current in the detector T, when the contact C2 is placed at such a point that A is to B as XE is to YE.

The switch is now thrown to the right or X position, resulting in the formation of a bridge as per Fig. 5 and the bridge is then balanced by adjusting B2. If the value of XE is not over 100 ohms, the switch 5 is thrown to the 100 position thus putting rheostat R3 in the circuit and if it exceeds 100 ohms, the switch is thrown to the 1000 position putting rheostat R4 in the circuit. If the resistance of XE exceeds 1000 ohms the bridge can not be balanced as 1000 ohms is the capacity of this particular meter.

When the switch is thrown from the percentage position to the X position, the portion C of rheostat R1 is placed in the same arm of the bridge as portion A of rheostat R2 and since they are at all times equal, the resistance of the bridge arm JK (Fig. 5) is doubled and since the resistance of bridge arms KL and LM remain as in Fig. 4, it is obvious that, in order to balance the bridge, we must add in the arm JM a resistance equal to resistance XE and therefore the bridge will balance when rheostat R3 (or R4) has been adjusted to the same value as resistance XE and the resistance of XE may therefore be read directly from the scale S3 (or S4).

While I have shown and described one embodiment of my invention in accordance with the patent statutes, it will be understood that my invention is capable of embodiment in a variety of forms of apparatus and that I am not limited to the specific arrangement or structural parts shown and described, but that the scope of invention is to be gauged by the accompanying claims taken in connection with the state of the prior art.

What I claim is:

1. A Wheatstone-bridge arrangement for measuring the resistance of an earth electrode as XE, which includes a reference electrode as YE, a potential electrode as PE, a source of current, a null indicator, a variable resistance unit as EF, and a pair of equal resistances as AB and CD each adjustably electrically divided into two parts and so interlocked that they can be adjusted only simultaneously and in like manner, and switching mechanism arranged to connect the above elements in either of two relationships such that in the first relationship a Wheatstone-bridge is formed in which the two parts, as A and B of resistance AB, constitute two adjacent ratio arms of the bridge, the electrodes YE and XE constitute the other two arms of the bridge, resistances B and YE being in adjacent arms, the source of current and the null indicator are connected to the arms as in the conventional Wheatstone-bridge, the connection to the junction of the arms containing YE and XE being established via the electrode PE, the whole being now arranged so that the bridge is in balance when A is to B as XE is to YE; and in the second relationship the above defined bridge is modified by doubling the ratio between the two ratio arms by including in one of the arms one part of resistance CD and further modified by connecting the variable resistance EF in the arm with resistance XE, the whole being now arranged so that the bridge is in balance when EF has the same value as XE.

2. A Wheatstone-bridge arrangement according to claim 1, characterized by the fact that the variable resistance EF is composed of a multiplicity of variable resistances together with a switch for selectively connecting in circuit any of said resistances.

3. A Wheatstone-bridge arrangement according to claim 1, characterized by the further fact that the variable resistance EF is composed of a multiplicity of variable resistance units together with a switch for selectively connecting in circuit any of said resistance units, the units being so positioned and interlocked that the manipulation of a single member serves to simultaneously vary the resistance of each of the units in like proportion.

In testimony whereof I affix my signature.

STEPHEN W. BORDEN.